(12) United States Patent
Wolrich et al.

(10) Patent No.: US 6,681,300 B2
(45) Date of Patent: Jan. 20, 2004

(54) READ LOCK MISS CONTROL AND QUEUE MANAGEMENT

(75) Inventors: Gilbert Wolrich, Framingham, MA (US); Daniel Cutter, Shrewsbury, MA (US); William Wheeler, Southborough, MA (US); Matthew J. Adiletta, Bolton, MA (US); Debra Bernstein, Sudbury, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/969,436

(22) Filed: Oct. 2, 2001

(65) Prior Publication Data

US 2002/0038403 A1 Mar. 28, 2002

Related U.S. Application Data

(63) Continuation of application No. 09/473,798, filed on Dec. 28, 1999, now Pat. No. 6,324,624.

(51) Int. Cl.[7] .............................................. G06F 12/00
(52) U.S. Cl. ...................... 711/152; 711/151; 711/145; 711/156; 711/104; 711/163; 710/52
(58) Field of Search ..................... 710/52, 54; 711/104, 711/118, 145, 151, 152, 156, 163

(56) References Cited

U.S. PATENT DOCUMENTS

| | | | |
|---|---|---|---|
| 4,400,770 A | * | 8/1983 | Chan et al. .................. 711/210 |
| 5,140,685 A | | 8/1992 | Sipple et al. |
| 5,155,831 A | | 10/1992 | Emma et al. ................ 711/121 |
| 5,347,648 A | * | 9/1994 | Stamm et al. .................. 714/5 |
| 5,404,482 A | * | 4/1995 | Stamm et al. .............. 711/108 |
| 5,517,648 A | | 5/1996 | Bertone et al. |
| 5,745,913 A | | 4/1998 | Pattin et al. ................. 711/105 |
| 5,809,530 A | | 9/1998 | Samra et al. ................ 711/140 |
| 6,073,215 A | | 6/2000 | Snyder ....................... 711/137 |
| 6,145,054 A | | 11/2000 | Mehrotra et al. ........... 711/119 |
| 6,324,624 B1 | * | 11/2001 | Wolrich et al. ............. 710/200 |
| 6,427,196 B1 | * | 7/2002 | Adiletta et al. ............... 710/39 |

FOREIGN PATENT DOCUMENTS

EP 0 464 715 A2 1/1992

OTHER PUBLICATIONS

Doyle, et al. Microsoft Press Computer Dictionary, $2^{nd}$ ed. 1994, Microsoft Press, Redmond, WA., p. 326.*

* cited by examiner

Primary Examiner—B. James Peikari
(74) Attorney, Agent, or Firm—Fish & Richardson P.C.

(57) ABSTRACT

Managing memory access to random access memory includes fetching a read lock memory reference request and placing the read lock memory reference request at the end of a read lock miss queue if the read lock memory reference request is requesting access to an unlocked memory location and the read lock miss queue contains at least one read lock memory reference request.

36 Claims, 5 Drawing Sheets

READ LOCK MISS CONTROL AND QUEUE MANAGEMENT

CROSS REFERENCE TO RELATED APPLICATIONS

This application is a continuation of U.S. Application Ser. No. 09/473,798, filed Dec. 28, 1999 now U.S. Pat. No. 6,324,624. The disclosure of the prior application is considered part of (and incorporated by reference in) the disclosure of this application.

BACKGROUND OF THE INVENTION

This invention relates to read lock memory references.

When a computer instruction (thread) needs access to a memory location in the computer, it goes to a memory controller. A memory reference instruction may request a read lock on a particular memory location. The read lock prevents other instructions from accessing that memory location until a read unlock instruction for that memory location gets granted.

SUMMARY OF THE INVENTION

According to one aspect of the invention, a method is described of managing memory access to random access memory includes fetching a read lock memory reference request and placing the read lock memory reference request at the end of a read lock miss queue if the read lock memory reference request is requesting access to an unlocked memory location and the read lock miss queue contains at least one read lock memory reference request.

Other advantages will become apparent from the following description and from the claims.

DESCRIPTION OF THE PREFERRED EMBODIMENTS

Figure 1:
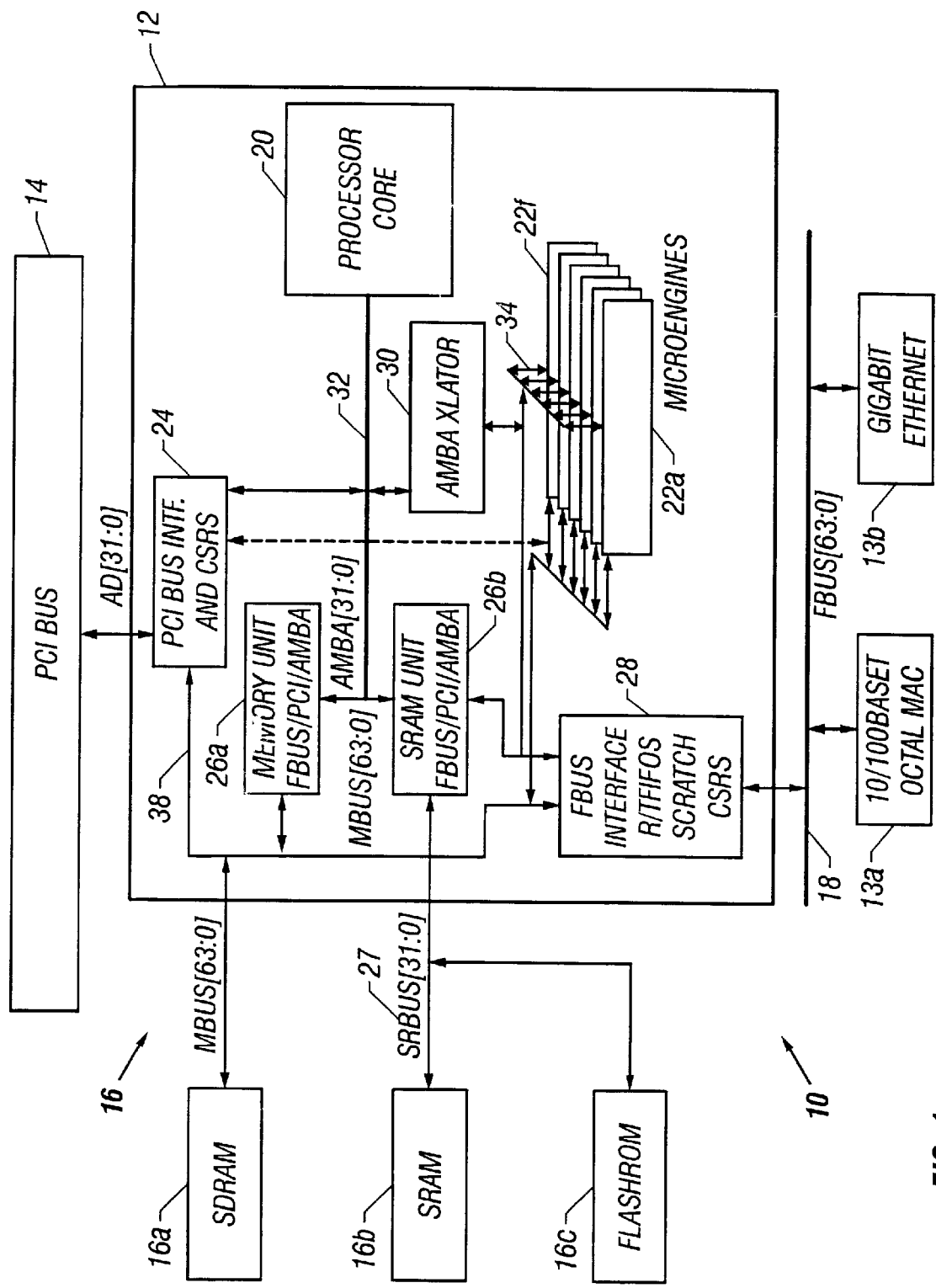
FIG. 1 is a block diagram of a communication system employing a hardware-based multithreaded processor.

Referring to FIG. 1, a communication system 10 includes a parallel, hardware-based multithreaded processor 12. The hardware-based multithreaded processor 12 is coupled to a bus such as a peripheral component interconnect (PCI) bus 14, a memory system 16, and a second bus 18. The system 10 is especially useful for tasks that can be broken into parallel subtasks or functions. Specifically, a hardware-based multithreaded processor 12 is useful for tasks that are bandwidth oriented rather than latency oriented. The hardware-based multithreaded processor 12 has multiple microengines 22a–22f, each with multiple hardware controlled threads that can be simultaneously active and independently work on a task.

The hardware-based multithreaded processor 12 also includes a central controller 20 that assists in loading microcode control for other resources of the hardware-based multithreaded processor 12 and performs other general purpose computer type functions such as handling protocols, exceptions, and extra support for packet processing where the microengines 22a–22f pass the packets off for more detailed processing such as in boundary conditions. In one embodiment, the processor 20 is a Strong Arm® (Arm is a trademark of ARM Limited, United Kingdom) based architecture. The general purpose microprocessor 20 has an operating system. Through the operating system the processor 20 can call functions to operate on microengines 22a–22f. The processor 20 can use any supported operating system, preferably a real time operating system. For the core processor implemented as a Strong Arm architecture, operating systems such as, MicrosoftNT real-time, VXWorks and $\mu$CUS, a freeware operating system available over the Internet, can be used.

The hardware-based multithreaded processor 12 also includes a plurality of function microengines 22a–22f. Functional microengines (microengines) 22a–22f each maintain a plurality of program counters in hardware and states associated with the program counters. Effectively, a corresponding plurality of sets of threads can be simultaneously active on each of the microengines 22a–22f while only one is actually operating at any one time.

In one embodiment, there are six microengines 22a–22f as shown. Each microengines 22a–22f has capabilities for processing four hardware threads. The six microengines 22a–22f operate with shared resources including memory system 16 and bus interfaces 24 and 28. The memory system 16 includes a Synchronous Dynamic Random Access Memory (SDRAM) controller 26a and a Static Random Access Memory (SRAM) controller 26b. SDRAM 16a and SDRAM controller 26a are typically used for processing large volumes of data, e.g., processing of network payloads from network packets. SRAM 16b and SRAM controller 26b are used in a networking implementation for low latency, fast access tasks, e.g., accessing look-up tables, memory for the core processor 20, and so forth.

The six microengines 22a–22f access either the SDRAM 16a or SRAM 16b based on characteristics of the data. Thus, low latency, low bandwidth data is stored in and fetched from SRAM 16b, whereas higher bandwidth data for which latency is not as important, is stored in and fetched from SDRAM 16a. The microengines 22a–22f can execute memory reference instructions to either the SDRAM controller 26a or the SRAM controller 26b.

Advantages of hardware multithreading can be explained by SRAM or SDRAM memory accesses. As an example, an SRAM access requested by a Thread_0, from a microengine 22a–22f will cause the SRAM controller 26b to initiate an access to the SRAM 16b. The SRAM controller 26b controls arbitration for the SRAM bus 27, accesses the SRAM 16b, fetches the data from the SRAM 16b, and returns data to the requesting microengine 22a–22f. During an SRAM 16b access, if the microengine, e.g., 22a, had only a single thread that could operate, that microengine would be dormant until data was returned from the SRAM 16b. The hardware context swapping within each of the microengines 22a–22f enables other contexts with unique program counters to execute in that same microengine. Thus, another thread, e.g., Thread_1, can function while the first thread, e.g., Thread_0, is awaiting the read data to return. During execution, Thread_1 may access the SDRAM memory 16a. While Thread_1 operates on the SDRAM unit 26a, and Thread_0 is operating on the SPAM unit 26b, a new thread, e.g., Thread_2, can now operate in the microengine 22a. Thread_2 can operate for a certain amount of time until it needs to access memory or perform some other long latency operation, such as making an access to a bus interface.

Therefore, simultaneously, the processor 12 can have a bus operation, SRAM operation, and SDRAM operation all being completed or operated upon by one microengine 22a and have one more thread available to process more work in the data path.

The hardware context swapping also synchronizes completion of tasks. For example, two threads could hit the same shared resource, e.g., SRAM 16b. Each one of these separate functional units, e.g., the FBUS interface 28, the SRAM controller 26b, and the SDRAM controller 26a, when they complete a requested task from one of the microengine thread contexts reports back a flag signaling completion of an operation. When the flag is received by the microengine 22a–22f, the microengine 22a–22f can determine which thread to turn on.

One example of an application for the hardware-based multithreaded processor 12 is as a network processor. As a network processor, the hardware-based multithreaded processor 12 interfaces to network devices such as a media access controller device, e.g., a 10/100BaseT Octal MAC 13a or a Gigabit Ethernet device 13b. In general, as a network processor, the hardware-based multithreaded processor 12 can interface to any type of communication device or interface that receives/sends large amounts of data. If communication system 10 functions in a networking application, it could receive a plurality of network packets from the devices 13a, 13b and process those packets in a parallel manner. With the hardware-based multithreaded processor 12, each network packet can be independently processed.

Another example for use of processor 12 is a print engine for a postscript processor or as a processor for a storage subsystem, i.e., RAID disk storage. A further use is as a matching engine. In the securities industry for example, the advent of electronic trading requires the use of electronic matching engines to match orders between buyers and sellers. These and other parallel types of tasks can be accomplished on the system 10.

Each of the functional units, e.g., the FBUS interface 28, the SRAM controller 26b, and the SDRAM controller 26a, are coupled to one or more internal buses. The internal buses are dual, 32-bit buses (i.e., one bus for read and one for write). The hardware-based multithreaded processor 12 also is constructed such that the sum of the bandwidths of the internal buses in the processor 12 exceeds the bandwidth of external buses coupled to the processor 12. The processor 12 includes an internal core processor bus 32, e.g., an ASB bus (Advanced System Bus), that couples the processor core 20 to the memory controller 26a, 26b and to an ASB translator 30. The ASB bus 32 is a subset of the so-called AMBA bus that is used with the Strong Arm processor core. The processor 12 also includes a private bus 34 that couples the microengine units to SRAM controller 26b, ASB translator 30, and FBUS interface 28. A memory bus 38 couples the memory controllers 26a, 26b to the bus interfaces 24 and 28 and memory system 16 including a flashrom 16c used for boot operations and so forth.

Figure 2A:
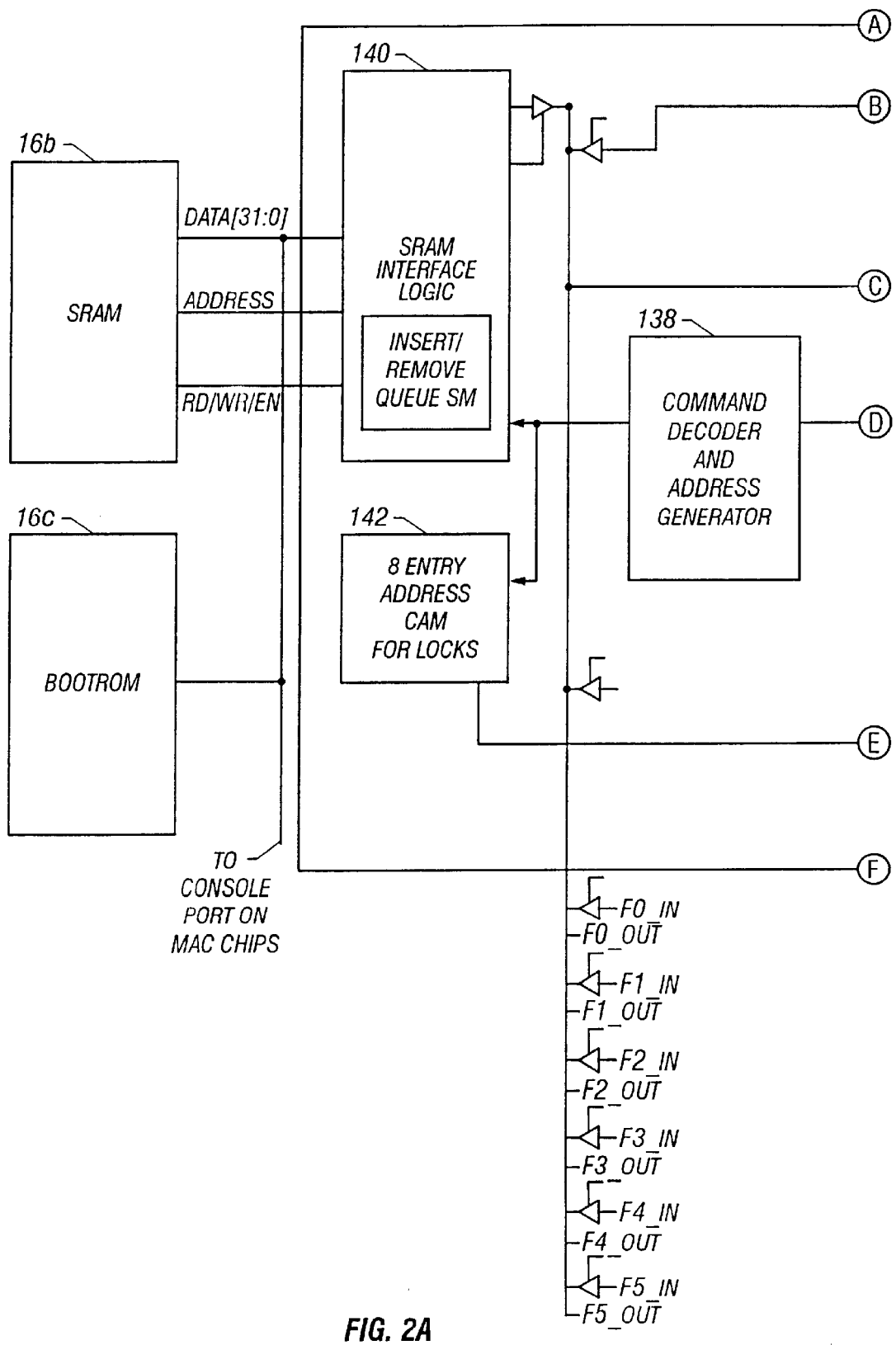
FIGS. 2A–2B show a block diagram of a memory controller for latency limited operations used in the hardware-based multithreaded processor.
Figure 2B:
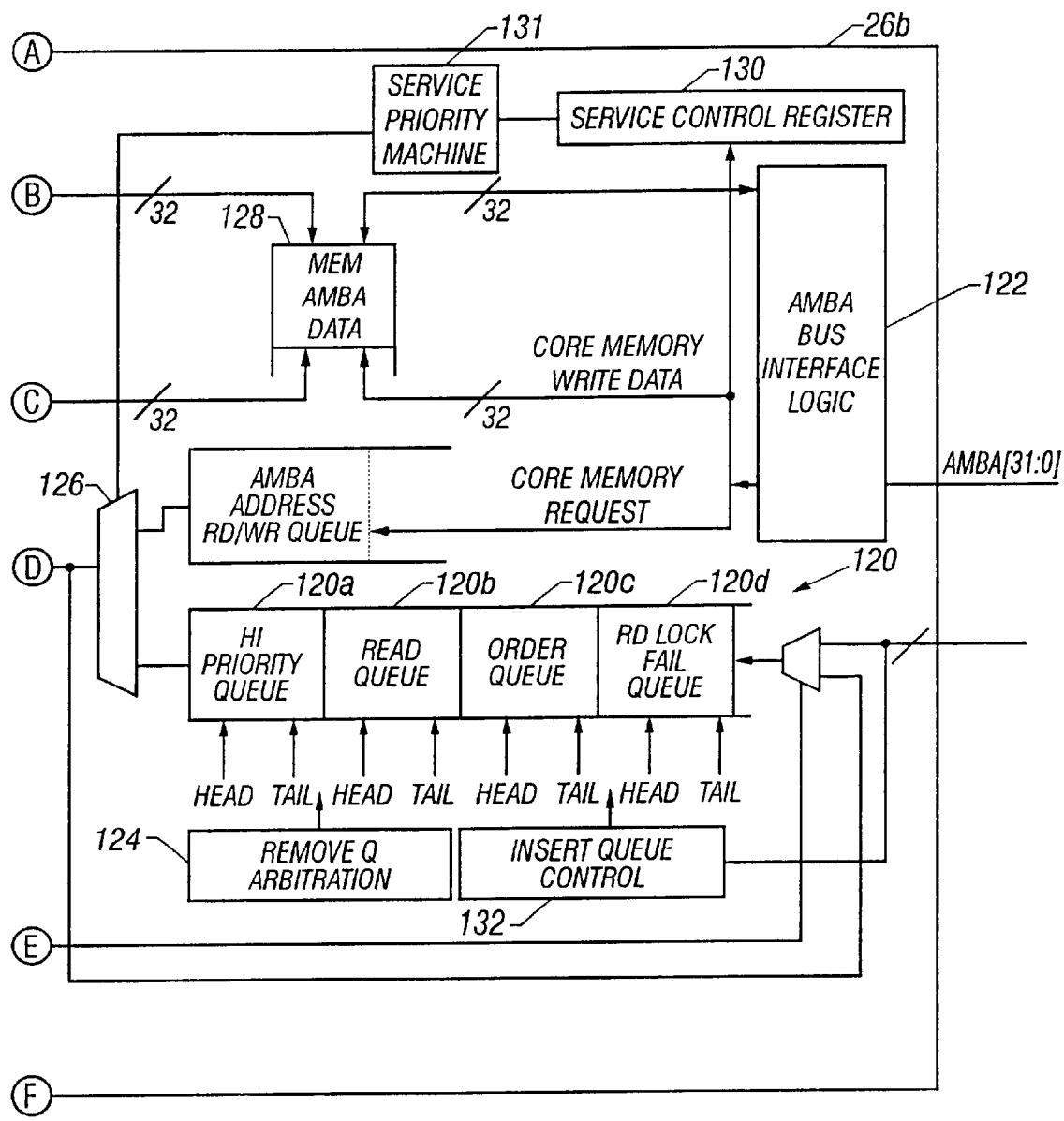

Referring to FIGS. 2A and 2B, the SRAM controller 26b for the SRAM 16b is shown. The SRAM controller 26b includes an address and command queue 120. SRAM controller 26b is optimized based on the type of memory operation, i.e., a read or a write. The address and command queue 120 includes a high priority queue 120a (holding memory reference requests from high priority tasks), a read queue 120b (holding read memory reference requests, which are the predominant memory reference functions that an SRAM performs), and an order queue 120c (holding, in general, all writes to SRAM 16b and reads that are to be non-optimized). Although not shown, the address and command queue 120 could also include a write queue. An insert queue control unit 132 of control logic determines where to queue each memory request from the microengines 22a–22f. An arbitration scheme in a remove queue arbitration unit 124 of control logic determines the processing order of the memory reference requests in the queues 120.

The SRAM controller 26b also includes core bus interface logic, e.g., ASB bus 122. The ASB bus interface logic 122 interfaces the core processor 20 to the SRAM controller 26b. The ASB bus 122 is a bus that includes a 32-bit data path and a 28-bit address path. The data is accessed to and from memory 16b through an MEM (microelectromechanical) ASB data device 128, e.g., a buffer. The MEM ASB data device 128 is a queue for write data. If there is incoming data from the core processor 20 via ASB interface 122, the data can be stored in the MEM ASB data device 128 and subsequently removed from the MEM ASB data device 128 through an SRAM interface 140 to SRAM memory 16b. Although not shown, the same queue structure can be provided for reads.

The memory requests are sent to SRAM interface 140 via a multiplexer 126. The multiplexer 126 is controlled by an SRAM arbiter 131 which detects the fullness of each of the queues and the status of the requests and from that decides priority based on a programmable value stored in a priority service control register 130. Once control to the multiplexer 126 selects a memory reference request, the memory reference request is sent to a command decoder and address generator 138 where it is decoded and an address is generated.

The SRAM controller 26b maintains control of the Memory Mapped off-chip SRAM and Expansion ROM. The SRAM controller 26b can address, e.g., 16 MBytes, with, e.g., 8 MBytes mapped for SRAM 16b, and 8 MBytes reserved for special functions including: Boot space via flashrom 16c; and Console port access for MAC devices 13a, 13b and access to associated (RMON) counters. The SRAM is used for local look-up tables and queue management functions.

The SRAM controller 26b supports the following transactions:

| Microengine requests | (via private bus) | to/from SRAM. |
|---|---|---|
| Core Processor | (via ASB bus) | to/from SRAM. |

The SRAM controller 26b performs memory reference sorting to minimize delays (bubbles) in the pipeline from the SRAM interface 140 to memory 16b. The SRAM controller 26b does memory reference sorting based on the read function. A bubble can either be one or two cycles depending on the type of memory device employed.

The SRAM controller 26b includes a lock look-up device 142, an eight-entry address content addressable memory (CAM) for look-ups of read locks. Each position includes a valid bit that is examined by subsequent read lock requests. The address and command queue 120 also includes a read lock miss (fail) queue 120d. The read lock miss queue 120d is used to hold up to twenty-four read requests that fail because of a lock existing on the portion of memory requested to be read. One of the microengines 22a–22f issues a read lock memory reference request that is processed in address and control queue 120.

Figure 3:
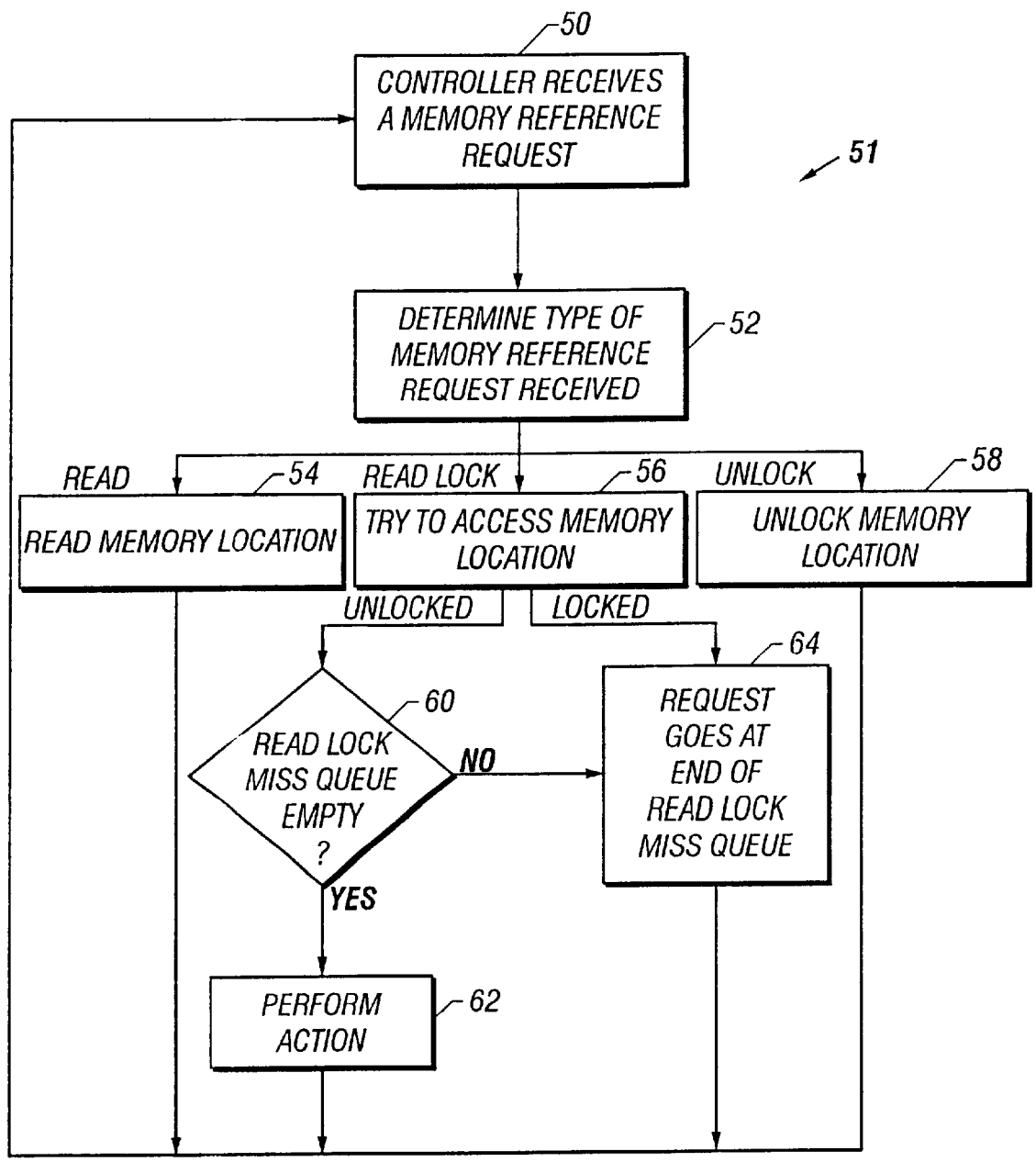
FIG. 3 is a flowchart of the operation of a memory controller in the hardware-based multithreaded processor.

Referring to FIG. 3, a memory reference request is processed 51 by the controller 26b. The controller 26b receives 50 a memory reference request on either the order queue 120c or the read queue 120b. The command decoder and address generator 138 determines 52 whether the memory reference request is a "read" request, a write request, a "read lock" request, or a write unlock ("unlock") request. If the command decoder and address generator 138 determines 52 that the request is a read request, then the command decoder and address generator 138 enters 54 the lock into the lock look-up device 142 so that subsequent read lock requests will find the memory location locked. Lock requests cannot be processed on that locked memory location until an unlock request from a microengine 22a–22f unlocks 58 that memory location.

If the command decoder and address generator 138 determines 52 that the memory reference request is a read lock request, the controller 26b will access 56 lock look-up device 142 to determine whether this memory location is already locked. The access 56 determines whether the read lock request gets performed 62 or enters 64 the read lock miss queue 120d where it waits for the memory location to be unlocked.

If the memory location is locked from any prior lock request, the read lock request fails and gets stored 64 at the end of the read lock miss queue 120d. The controller 26b proceeds to receive 50 the next request.

If the memory location is unlocked, the lock look-up device 142 checks 60 to see if the read lock miss queue 120d is empty. If the read lock miss queue 120d is empty, that indicates that there are no previous read lock requests awaiting processing. Thus, the read lock request will be processed: the address of the memory reference will be used by the SRAM interface 140 to perform 62 an SPAM address read/write request to memory 16b and subsequently lock the memory location. Then the controller 26b receives 50 the next request.

If the read lock miss queue 120d is not empty, that indicates that there is at least one prior read lock request awaiting processing. To ensure a first-in/first-out order of processing the read lock requests, the read lock request will be stored 64 at the end of the read lock miss queue 120d. Read lock requests continue queuing in the read lock miss queue 120d until the controller 26b receives 50 an unlock request and recognizes 52 it as such. A memory location is unlocked by operation of a microcontrol instruction in a program after the need for the lock has ended. Once the unlock request is received 50, the memory location is unlocked 58 by clearing the valid bit in the CAM 142. After the unlock 58, the read lock fail queue 120d becomes the highest priority queue 120, giving all queued read lock misses a chance to issue a memory lock request.

Figure 4:
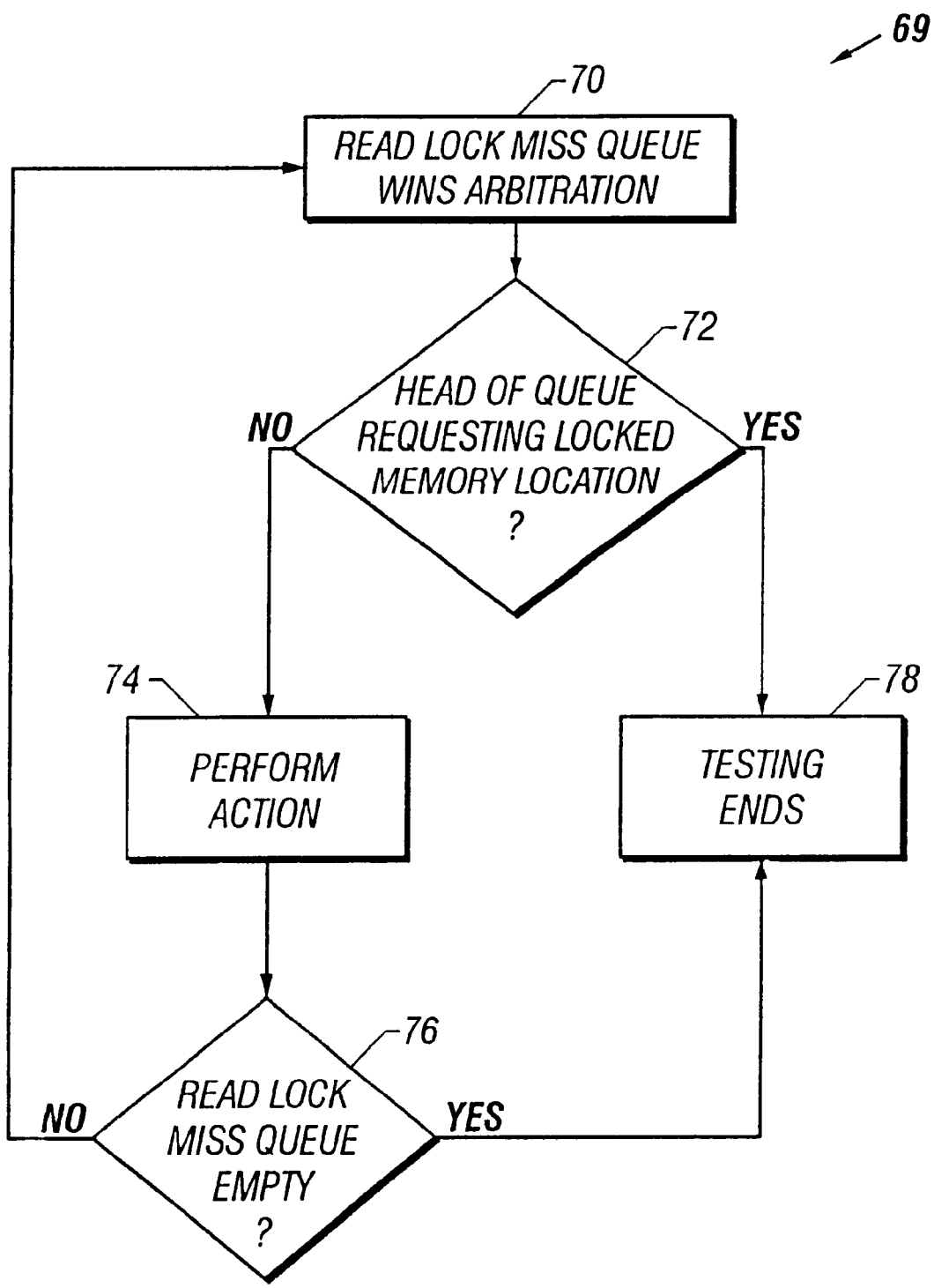
FIG. 4 is a flowchart of the operation of a memory controller in the hardware-based multithreaded processor.

Referring to FIG. 4, the read lock miss queue 120d is tested 69 to see if the head of the read lock miss queue 120d may be granted its lock. The testing 69 will continue until the read lock miss queue 120d fails to provide a grant or until there are no more entries in the read lock miss queue 120d. The highest priority is given to the read lock miss queue 120d by letting it win 70 the next arbitration in the remove queue arbitration unit 124. The lock look-up device 142 checks 72 to see if the top read lock request (the one stored first in the read lock miss queue 120d) is requesting to read an unlocked memory location. If the read lock request is for a locked location, the read lock miss queue 120d remains as it is to ensure the first-in/first-out order described above, and the testing 69 ends 78. If the read lock request is for an unlocked location, the address of the memory reference will be used by the SRAM interface 140 to perform 74 an SRAM address read/write request to memory 16b. After performing 74, the lock look-up device 142 checks 76 to see if the read lock miss queue 120d is empty. If it is empty, the testing 69 ends 78. Otherwise, the testing 69 continues with the read lock miss queue 120d winning 70 another arbitration in the remove queue arbitration unit 124.

Other embodiments are within the scope of the following claims.

What is claimed is:

1. A method of managing memory access to random access memory comprising:
   fetching a memory reference request;
   if the memory reference request is of a read type requesting to read a memory location, processing the memory reference request;
   if the memory reference request is of an unlock type requesting to unlock a memory location, processing the memory reference request;
   if the memory reference request is of a read lock type requesting access to a memory location, determining if the memory location is locked; and
   if the memory location is locked, placing the memory reference request at the end of a read lock miss queue.

2. The method of claim 1 further comprising if the memory location is unlocked, placing the memory reference request at the end of the read lock miss queue if the read lock miss queue contains at least one memory reference request.

3. The method of claim 1 further comprising if the memory location is unlocked, processing the memory reference request if the read lock miss queue does not contain at least one memory reference request.

4. The method of claim 1 which the random access memory includes static random access memory.

5. The method of claim 1 further comprising processing memory reference requests included in the read lock miss queue in the order in which the memory reference requests were placed in the read lock miss queue.

6. An article comprising a computer-readable medium which stores computer-executable instructions for managing memory access to random access memory, the instructions causing a computer to:
   fetch a memory reference request;
   if the memory reference request is of a read type requesting to read a memory location, process the memory reference request;
   if the memory reference request is of an unlock type requesting to unlock a memory location, process the memory reference request;
   if the memory reference request is of a read lock type requesting access to a memory location, determine if the memory location is locked; and
   if the memory location is locked, place the memory reference request at the end of a read lock miss queue.

7. The article of claim 6 further causing a machine to, if the memory location is unlocked, place the memory reference request at the end of the read lock miss queue if the read lock miss queue contains at least one memory reference request.

8. The article of claim 6 further causing a machine to, if the memory location is unlocked, process the memory reference request if the read lock miss queue does not contain at least one memory reference request.

9. The article of claim 6 in which the random access memory includes static random access memory.

10. The article of claim 6 further causing a machine to process memory reference requests included in the read lock miss queue in the order in which the memory reference requests were placed in the read lock miss queue.

11. A method of managing memory access to random access memory comprising:
   choosing in an arbitration among a plurality of memory reference requests included in a plurality of queues to process a memory reference request included in a read lock miss queue;
   processing a read lock memory reference request included at a head of the read lock miss queue if the read lock memory reference request is requesting access to an unlocked memory location; and
   enabling another memory reference request included in the read lock miss queue to be chosen in an immediately subsequent arbitration if the read lock memory request is requesting access to an unlocked memory location and if the read lock miss queue includes at least one memory reference request other than the read lock memory reference request.

12. The method of claim 11 further comprising choosing in another arbitration among the plurality of memory reference requests another memory reference request if the read lock memory reference request is requesting access to a locked memory location.

13. The method of claim 12 further comprising processing the other memory reference request.

14. The method of claim 11 further comprising determining in the arbitration to process a memory reference request included in one of a plurality of queues, one of the queues including the read lock miss queue.

15. The method of claim 11 further comprising providing a highest priority to the read lock miss queue to enable the read lock miss queue to be chosen in the arbitration.

16. The method of claim 11 in which the plurality of queues includes a read queue.

17. The method of claim 11 in which the plurality of queues includes an order queue.

18. An article comprising a computer-readable medium which stores computer-executable instructions for managing memory access to random access memory, the instructions causing a computer to:
   choose in an arbitration among a plurality of memory reference requests included in a plurality of queues to process a memory reference request included in a read lock miss queue;
   process a read lock memory reference request included at a head of the read lock miss queue if the read lock memory reference request is requesting access to an unlocked memory location; and
   enable another memory request included in the read lock miss queue to be chosen in an immediately subsequent arbitration if the read lock memory request is requesting access to an unlocked memory location and if the read lock miss queue includes at least one memory reference request other than the read lock memory reference request.

19. The article of claim 18 further causing a machine to choose in another arbitration among the plurality of memory reference requests another memory reference request if the read lock memory reference request is requesting access to a locked memory location.

20. The article of claim 18 further causing a machine to process the other memory reference request.

21. The article of claim 18 further causing a machine to determine in the arbitration to process a memory reference request included in one of a plurality of queues, one of the queues including the read lock miss queue.

22. The article of claim 18 further causing a machine to provide a highest priority to the read lock miss queue to enable the read lock miss queue to be chosen in the arbitration.

23. The article of claim 18 in which the plurality of queues includes a read queue.

24. The article of claim 18 in which the plurality of queues includes an order queue.

25. A system of managing memory access to random access memory comprising:
   a queue that stores read memory reference requests requesting to read a memory location in memory, unlock memory reference requests requesting to unlock a memory location in memory, and read lock memory reference requests requesting access to a memory location in memory;
   an arbitration unit that determines a processing order of memory reference requests included in the queue; and
   a controller that processes a read lock memory reference request included at a head of the read lock miss queue if the read lock memory reference request is requesting access to an unlocked memory location and enables the arbitration unit to choose to process another read lock memory reference request included in the queue if the read lock memory request is requesting access to an unlocked memory location and if the queue includes at least one read lock memory reference request other than the read lock memory reference request.

26. The system of claim 25 further comprising an address content addressable memory that supports locked locations.

27. The system of claim 25 in which the memory includes static random access memory.

28. An apparatus for managing memory access to random access memory, comprising:
   a memory that stores executable instructions; and
   a processor that executes the instructions to:
      fetch a read lock memory reference request; and
      place the read lock memory reference request at the end of a read lock miss queue if the read lock memory reference request is requesting access to an unlocked memory location and the read lock miss queue contains at least one read lock memory reference request.

29. The apparatus of claim 28 wherein the random access memory is located in a parallel, hardware-based multi-threaded processor.

30. The apparatus of claim 28 wherein the random access memory comprises a static random access memory.

31. The apparatus of claim 28 further comprising instructions to place the read lock memory reference at the end of a read lock miss queue if the read lock memory reference request is requesting access to a locked memory location.

32. The apparatus of claim 28 further comprising instructions to remove the read lock memory reference requests from the read lock miss queue in the order in which they were placed in the read lock miss queue.

33. The apparatus of claim 28 wherein the read lock memory reference request is fetched from a read queue.

34. The apparatus of claim 28 wherein the read lock memory reference request is fetched from an order queue.

35. The apparatus of claim 28 wherein the read lock miss queue contains a number of entries equal to a number of contexts that may execute the read lock memory reference requests minus one.

36. The apparatus of claim 28 further comprises instructions to place a read lock memory reference request in a queue that contains a read lock memory reference request requesting access to the same memory location.

* * * * *